Patented June 9, 1931

1,809,449

UNITED STATES PATENT OFFICE

WILLIAM G. LINDSAY, OF NEWARK, NEW JERSEY, ASSIGNOR, BY MESNE ASSIGNMENTS, TO CELLULOID CORPORATION, A CORPORATION OF NEW JERSEY

IMITATION PEARL

No Drawing.    Application filed March 19, 1925.    Serial No. 16,681.

This invention relates to decorated plastic materials employing a base of which celluloid is an example, and to an improved method of making such materials. More particularly, this invention relates to imitation of natural substances such as pearl, cat's-eye and various semi-precious stones characterized by a scintillating, lustrous, metallic or pearly appearance. One object of the present invention is to produce economically materials of this character which will retain their appearance permanently.

In accordance with my invention, I incorporate into a base of plastic material certain metallic salts, as distinguished from metals or alloys, particularly such salts as may be obtained in the form of a fine, silky or silvery precipitate; for example, certain salts of mercury, bismuth or the like. As a specific example, I may use a white silvery variety of mercurous chloride, $Hg_2Cl_2$. This form of mercurous chloride may be obtained as a precipitate by adding to an aqueous solution of mercuric chloride, in the presence of hydrochloric acid, an aqueous solution of stannous chloride, avoiding an excess of the stannous chloride in accordance with the following reaction:

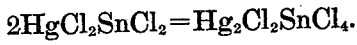
$$2HgCl_2 SnCl_2 = Hg_2Cl_2 SnCl_4.$$

The size of the particles will be controlled largely by the concentration and temperature of the solution. In practice, I prefer to operate with relatively cold solutions, that is, solutions of about room temperature, say from 20 to 25° C. or somewhat lower. Concentration of the mercuric chloride solution may be of ½ to ¼ saturation, or even less, and the amount of hydrochloric acid may be substantially 10 to 12% of the amount of the mercuric chloride solution. Although the amount of hydrochloric acid may be increased or varied, in practice I prefer to employ solution of mercuric chloride containing substantially 10 to 12% of hydrochloric acid. To this hydrochloric acid a solution of mercuric chloride a solution of stannous chloride of approximately 10% or less is added, according to the above reaction, taking care that an excess of stannous chloride is avoided. In practice, a slight excess of mercuric chloride to the extent of 3 to 10% of the amount present in the solution gives good results.

The mercurous chloride formed upon the addition of the stannous chloride solution will be precipitated in the form of fine silvery particles, and on stirring the precipitate and solution in which it is formed the particles take on a wavy, silky, lustrous, silvery-white appearance. The particles are now separated from the supernatant liquor by any one of a number of known methods, such, for instance, as sedimentation, filtration and the like. In practice, I may separate the precipitate by allowing it to settle for a suitable length of time and decant off the clear liquid. This liquid may then be replaced by pure water. The operation of settling, decanting and replacement with pure water is continued until all of the hydrochloric acid, stannic chloride and mercuric chloride are removed. The precipitate may then be drained free from excess water and incorporated with various solvents of pyroxylin or similar soluble cellulosic compounds, preferably without drying or removing the water from the drained or settled precipitate, or where it is desired to remove the precipitate from the supernatant liquid by filtering and washing in an ordinary filter, the residual water may be displaced by suitable solvents such as ethyl alcohol, methyl alcohol and the like.

In one application of this invention I may incorporate 50 parts by weight of the mercurous chloride precipitate (estimated on the dry basis) with 100 parts by weight of a mixture of equal parts of methyl alcohol, ethyl alcohol and amyl-acetate, the precipitate being incorporated into the mixture of these solvents by suitable stirring until a uniform suspension has been produced. Into this suspension I may incorporate from 10 to 15 parts by weight of pyroxylin, or more, and the resultant solution containing the dissolved pyroxylin and mercurous chloride in suspension may be used for producing pearl-like or other effects by any one of a number of methods. In other words, I include in my invention combinations from liquid solutions, such as varnishes or dopes, to the more solid masses manipulated in rolls and presses. This solution may for example be employed to manufacture imitation pearls, by coating beads or the like in a manner well known in the art.

In making a sheeted pyroxylin plastic mass, where the object is the production of a pearl-like effect or configuration, I may use this solution for incorporation with a transparent pyroxylin camphor roll product. By roll product I mean that composition which is known to those skilled in the art of making pyroxylin plastic compounds by manipulation of the soft or plasticized base on rolls, which rolling operation usually precedes the pressing, sheeting and seasoning operations. The incorporation of this pyroxylin solution containing the mercurous chloride compound may be during the operation of rolling the soft plastic mass, or I may first form sheets from the rolled plastic mass and coat these sheets with the solution containing this precipitate, using sufficient of the pyroxylin mercurous chloride solution to produce with the roll product a proportion of about 1 to 2 parts of the mercurous chloride to 100 parts of pyroxylin, but I do not limit myself to these proportions as more or less may be used, depending upon the effect to be obtained; but, in general, about 1 to 1.4 parts of mercurous chloride to 100 parts of pyroxylin will produce satisfactory results. Where the pyroxylin mercurous chloride is applied to the sheets from the rolls, the sheets are produced in the thickness of about 20/1000ths of an inch, suitably coated with the mixture, stacked in layers of the thickness of about ½ inch and re-rolled, and in this method avoiding any excessive upsetting of the particles, the object being to preserve the bulk of the particles in substantially the same plane as they attain on the application of the pyroxylin mixture to the rolled sheets. The re-rolled sheets are then assembled in a chase in thicknesses of 2 to 5 inches in the same plane, following a method well known to those skilled in the art of making pyroxylin plastic materials. The pressed, suitably colored mass is then sheeted in the usual way. Sheets of approximately 30 to 40/1000ths of an inch in thickness will present a pearl-like or scintillating effect.

By forming the pyroxylin solution containing the mercurous chloride of proper consistency, this solution may be spread on a surface, say, of glass, or on a belt, or flowed on a film wheel according to the practice prevailing in the manufacture of photo films, and the solution allowed to dry and subsequently stripped from the supporting surface. It is believed that by this method the particles of mercurous chloride in the pyroxylin solution form themselves into substantially the same plane as that of the supporting surface on which the solution is spread and the particles have extended surfaces arranged in substantially one direction. In forming these sheets, I preferably employ ¾ to 1½ parts of the mercurous chloride to 100 parts of pyroxylin, although more or less may be used.

In producing one form of this invention, I may take a sufficient quantity of these flowed sheets the thickness of which will vary from 3/1000 to 15/1000 inch or of any thickness that can conveniently be made by flow method and weld them together in a chase, building up a mass of about 2 to 5 inches in thickness and employing a small amount of solvent for cementing the sheets together. On solidification in the chase the sheets may be substantially in one plane, or they may be so arranged as to take on a wavy appearance, or other effects may be produced at this stage depending upon the divergence of the sheets from the horizontal as stacked up in the chase. The sheets may then be planed off into whatever thickness may be desired, say 20/1000 inch thickness. The resulting sheet will show a pearly effect similar in appearance to the ordinary "mother of pearl", but somewhat plain or of moderate configuration. The effect varies with the direction along which the sheets are cut. In general, this direction should not be perpendicular to the plane of the original sheets as the result will be a partial or total absence of any lustrous effect. If it is desired to accentuate the configuration, or produce a definite design, a number of modifications of this process may be followed. For example, I plane this plastic block into sheets of 5, 10, 15 or 20/1000 inches thickness or even more, and then cut the sheets into odd sizes, say 4 in. x 5 in., or 5 in. x 8 in., or irregular shapes. These are re-stacked in the chase, and re-solidified by means of heat and pressure and the use of a small amount of cement or solvent on the surface of the sheets to insure a thorough welding or cementing. The block thus made may then be planed into various thicknesses, whereupon it will be noted that the resultant sheets possess a configuration or pattern which will reflect a pearly surface from various angles.

Other methods of incorporating compounds of this character into plastic masses will suggest themselves to those skilled in the art.

While I have referred to the plastic employed as pyroxylin, it is to be understood that other materials may be employed in place of pyroxylin such, for example, as other compounds of cellulose such as acetyl cellulose, cellulose ethers and other plastic materials such as gelatin; also in certain cases I may employ other transparent media for holding the particles of mercurous chloride, or I may employ, in certain cases, a non-transparent supporting surface for the mercurous chloride.

A similar silky scintillating or silvery precipitate may be obtained by using mercuric bromide in place of mercuric chloride in the foregoing process of preparing the mercurous chloride, but in practice I prefer to use mercuric chloride. The size of the particles which I use may be from 20/1000 to 60/1000 of a mm. or larger, but for certain special luminous or pearly effects I prefer particles of 20/1000 of a mm., and less.

I claim:

1. A pearl-like material comprising a transparent medium containing particles of the silky variety of mercurous chloride.

2. A thermo-plastic material comprising a plasticized cellulose compound and precipitated silky mercurous chloride incorporated therein.

3. A thermo-plastic flowed sheet containing the silky variety of mercurous chloride.

4. A translucent article formed of a pyroxylin plastic having the silky variety of mercurous chloride distributed throughout the body thereof.

5. A thermo-plastic sheet of less than 15/1000 inch in thickness containing silky precipitated mercurous chloride.

6. A thermo-plastic sheet of less than 15/1000 inch in thickness containing particles of silky precipitated mercurous chloride, said particles having their extended faces arranged in substantially one direction.

7. A thermo-plastic roll product containing 100 parts of pyroxylin and one to 2 parts of silky precipitated mercurous chloride.

8. A flowed sheet of plastic material containing 100 parts of pyroxylin and ¾ to 1½ parts of silky precipitated mercurous chloride.

9. A liquid pyroxylin composition comprising approximately 50 parts of silky precipitated mercurous chloride, 10 to 15 parts of pyroxylin and 100 parts of a volatile solvent for the pyroxylin.

10. As a decorative material, a solution of a binding medium containing silky mercurous chloride.

11. As a decorative material, a liquid solution of a binding agent holding in suspension silky mercurous chloride.

12. The method of forming a decorated material which comprises precipitating from aqueous solution silky mercurous chloride and incorporating said precipitate without drying into the body of a plastic material.

13. The method of making a decorated material which consists in precipitating from aqueous solution silky mercurous chloride, washing said precipitate and incorporating said precipitate, while still wet, into a cellulose ester plastic.

14. The method of forming a decorated material which comprises precipitating from aqueous solution silky mercurous chloride and incorporating said precipitate without drying into the body of a plastic material in such a manner that the particles of mercurous chloride lie in substantially one direction.

15. An artificial pearl essence adapted to produce pearly effects comprising a silky, silvery precipitate of mercurous chloride mixed in thick liquid suspension.

16. An artificial pearl essence adapted to product pearly effects comprising a silky, silvery precipitate of mercurous chloride mixed in thick aqueous suspension.

17. A pearl material comprising a transparent medium containing a finely divided crystalline precipitate of a salt of mercury distributed within said medium and imparting thereto a scintillating and pearly effect; such minute crystals of said precipitate being about 20/1000ths mm. or less in size.

18. A pearl material comprising a transparent medium containing a finely divided crystalline precipitate of a salt of mercury distributed within said medium and imparting thereto a scintillating and pearly effect, such minute crystals of said precipitate being about 20/1000ths mm. or less in size; said crystals when incorporated in a thermo-plastic mass of a cellulose ester base having their extended faces arranged in substantially one direction.

19. A decorative thermoplastic material containing particles of a silky precipitate of a metallic salt distributed within and throughout the material in amount and of a size imparting to said material a pearly lustre, said particles being arranged generally to have their lustrous extended surfaces in substantially one direction.

20. The method of forming a decorative material which comprises precipitating from a solution a silky, scintillating precipitate of a metallic salt in particles of a size sufficiently fine to give a pearly effect when distributed in a transparent medium, and incorporating said precipitate by mixing it into a mass of plastic material and below the surface thereof so as to impart to said material a pearly lustre.

21. An artificial pearl essence adapted to produce pearly effects when distributed within a transparent medium and comprising a silky, scintillating precipitate of a metallic salt in thick suspension in a liquid miscible with said transparent medium, the particles of said precipitate being sufficiently fine to impart a pearly lustre when embedded in said medium.

22. An artificial pearl essence adapted to produce pearly effects when distributed within a transparent medium and comprising a silky, scintillating precipitate of a metallic salt in thick liquid suspension in a dissolved cellulose composition, the particles of said precipitate being sufficiently fine to impart a pearly lustre when embedded in said medium.

WILLIAM G. LINDSAY.